US012205531B2

(12) United States Patent
Lin et al.

(10) Patent No.: US 12,205,531 B2
(45) Date of Patent: Jan. 21, 2025

(54) DEVICE AND METHOD FOR IMPROVED LED DRIVING

(71) Applicant: Apple Inc., Cupertino, CA (US)

(72) Inventors: Chin-Wei Lin, San Jose, CA (US); Hung Sheng Lin, San Jose, CA (US); Vasudha Gupta, Cupertino, CA (US); Shinya Ono, Santa Clara, CA (US); Tsung-Ting Tsai, San Jose, CA (US); Shyuan Yang, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/306,690

(22) Filed: Apr. 25, 2023

(65) Prior Publication Data

US 2023/0260452 A1 Aug. 17, 2023

Related U.S. Application Data

(63) Continuation of application No. 17/204,803, filed on Mar. 17, 2021, now Pat. No. 11,670,219, which is a continuation of application No. 16/678,203, filed on Nov. 8, 2019, now Pat. No. 10,984,706, which is a continuation of application No. 16/425,604, filed on May 29, 2019, now Pat. No. 10,573,229, which is a continuation of application No. 15/298,085, filed on Oct. 19, 2016, now Pat. No. 10,339,855.

(60) Provisional application No. 62/381,404, filed on Aug. 30, 2016.

(51) Int. Cl.

| | |
|---|---|
| ***G09G 3/32*** | (2016.01) |
| ***G09G 3/3233*** | (2016.01) |
| ***G09G 3/3291*** | (2016.01) |

(52) U.S. Cl.
CPC ............. *G09G 3/32* (2013.01); *G09G 3/3233* (2013.01); *G09G 3/3291* (2013.01); *G09G 2300/0842* (2013.01); *G09G 2300/0861* (2013.01); *G09G 2310/0251* (2013.01); *G09G 2310/0297* (2013.01); *G09G 2310/061* (2013.01); *G09G 2320/0247* (2013.01); *G09G 2330/021* (2013.01); *G09G 2340/0435* (2013.01)

(58) Field of Classification Search
CPC ............. G09G 3/32; G09G 2300/0819; G09G 3/3225; G09G 3/3266
See application file for complete search history.

(56) References Cited

U.S. PATENT DOCUMENTS

| | | | |
|---|---|---|---|
| 8,659,587 | B2 | 2/2014 | Slack et al. |
| 8,860,639 | B2 | 10/2014 | Kim et al. |
| 9,412,303 | B2 | 8/2016 | Kim et al. |
| 10,339,855 | B2 | 7/2019 | Lin et al. |
| 10,573,229 | B2 | 2/2020 | Lin et al. |
| 2005/0057466 | A1 | 3/2005 | Sala et al. |

(Continued)

FOREIGN PATENT DOCUMENTS

| | | |
|---|---|---|
| WO | 2014062425 A1 | 4/2014 |

*Primary Examiner* — Kevin M Nguyen
(74) *Attorney, Agent, or Firm* — Jinie M. Guihan

(57) ABSTRACT

An electronic device comprises a display and a controller. The controller is configured to provide a first frequency refresh rate to the display. The controller is also configured to generate a control signal configured to control emission of a light emitting diode of a display pixel of the display at a second frequency based on whether the first frequency refresh rate of the display is less than a predetermined threshold value.

20 Claims, 11 Drawing Sheets

(56) References Cited

U.S. PATENT DOCUMENTS

| | | | | |
|---|---|---|---|---|
| 2006/0146056 | A1 | 7/2006 | Wyatt | |
| 2006/0158398 | A1 | 7/2006 | Akimoto et al. | |
| 2008/0079670 | A1 | 4/2008 | Asano | |
| 2012/0026155 | A1 | 2/2012 | Komiya et al. | |
| 2012/0069059 | A1 | 3/2012 | Lee | |
| 2013/0038589 | A1* | 2/2013 | Tseng | G09G 3/3233 345/76 |
| 2013/0043802 | A1 | 2/2013 | Han et al. | |
| 2013/0100173 | A1 | 4/2013 | Chaji et al. | |
| 2015/0187272 | A1 | 7/2015 | Kimura et al. | |
| 2015/0243203 | A1 | 8/2015 | Kim et al. | |
| 2015/0243210 | A1 | 8/2015 | Park et al. | |
| 2015/0243253 | A1 | 8/2015 | Sone et al. | |
| 2015/0371589 | A1 | 12/2015 | Kim et al. | |
| 2016/0012774 | A1 | 1/2016 | Ohara et al. | |
| 2016/0055792 | A1* | 2/2016 | Lee | G09G 3/3233 315/173 |
| 2016/0307518 | A1 | 10/2016 | Kimura et al. | |
| 2016/0365035 | A1 | 12/2016 | Parl | |
| 2017/0162113 | A1* | 6/2017 | Lin | G09G 3/3266 |

* cited by examiner

DEVICE AND METHOD FOR IMPROVED LED DRIVING

CROSS REFERENCE TO RELATED APPLICATIONS

This application is a continuation of U.S. patent application Ser. No. 17/204,803, filed Mar. 17, 2021, entitled "Device and Method for Improved LED Driving," which is a continuation of U.S. patent application Ser. No. 16/678,203, filed Nov. 8, 2019, now U.S. Pat. No. 10,984,706, entitled "Device and Method for Improved LED Driving," which is a continuation of U.S. patent application Ser. No. 16/425,604, filed May 29, 2019, now U.S. Pat. No. 10,573,229, entitled "Device and Method for Improved LED Driving," which is a continuation of U.S. patent application Ser. No. 15/298,085, filed Oct. 19, 2016, now U.S. Pat. No. 10,339,855, entitled "Device and Method for Improved LED Driving," which is a Non-Provisional application claiming priority to U.S. Provisional Patent Application No. 62/381,404, entitled "Device and Method for Improved LED Driving", filed Aug. 30, 2016, which are incorporated by reference in their entireties.

BACKGROUND

The present disclosure relates generally to electronic displays and, more particularly, to devices and methods for achieving a reduction in visual artifacts related to reduced refresh rates of a light emitting diode (LED) electronic displays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Flat panel displays, such as active matrix organic light emitting diode (AMOLED) displays, micro-LED (μLED) displays, and the like, are commonly used in a wide variety of electronic devices, including such consumer electronics as televisions, computers, and handheld devices (e.g., cellular telephones, audio and video players, gaming systems, and so forth). Such display panels typically provide a flat display in a relatively thin package that is suitable for use in a variety of electronic goods. In addition, such devices may use less power than comparable display technologies, making them suitable for use in battery-powered devices or in other contexts where it is desirable to minimize power usage.

LED displays typically include picture elements (e.g. pixels) arranged in a matrix to display an image that may be viewed by a user. Individual pixels of an LED display may generate light as a voltage is applied to each pixel. The voltage applied to a pixel of an LED display may be regulated by, for example, thin film transistors (TFTs). For example, a circuit switching TFT may be used to regulate current flowing into a storage capacitor, and a driving TFT may be used to regulate the voltage being provided to the LED of an individual pixel. Finally, the growing reliance on electronic devices having LED displays has generated interest in extending the life of the electronic display on a single charge without inducing visual disturbances on the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relate to devices and methods for increasing power conservation for LED displays, such as AMOLED or μLED displays, while reducing potential visual artifacts that may accompany the increases in power conservation. For LED displays, emissive power is content dependent and not governed by backlight power—as in case of a Liquid Crystal Display (LCD). Therefore, for display applications including, but not limited to, watch screens having mostly black screens, emissive powering of the LEDs is minimal. Instead, panel driving power becomes more important.

Accordingly, one technique to reduce power consumption of an LED device may include reducing the panel refresh rate (e.g., the rate at which an array of display pixels in the display written to with image data) from, for example, 60 Hz to 30 Hz or less. This type of refresh rate reduction driving of the display can reduce the amount of power expended to drive the display; hence, enhancing battery life of a device significantly. However, utilizing reduced refresh rate driving may also be accompanied by generation of visual artifacts that are displayed on the display. For example, one visual artifact that may be generated is flicker, which may be perceived because of brightness variation within the same frame for the same refresh rate of the display. Accordingly, the present disclosure includes devices and techniques that utilize reduced refresh rate driving to decrease power consumption in an electronic device while simultaneously reducing visual artifacts generated on display that may otherwise be introduced due to the reduced refresh rate driving of the display.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
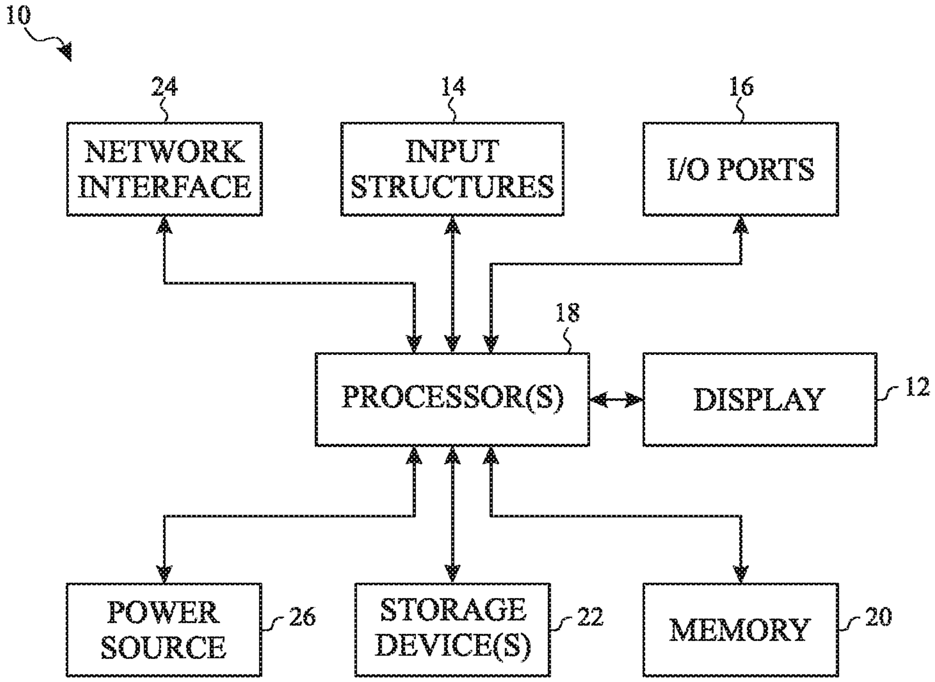
FIG. 1 is a block diagram of a electronic device with an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, present embodiments relate to electronic displays, particularly to light emitting diode (LED) displays, such as active matrix organic light emitting diode (AMOLED) displays and micro-LED (μLED) displays. In particular, power consumption of LED displays can be reduced if the display refresh rate (e.g., a data refresh rate at which a frame of image data is for a display is repeated in a period of time, such as one second, and/or the number of times content on the LED display repeats per period of time, such as one second) is reduced from, for example, 60 Hz to 30 Hz or even lower. This type of reduced refresh rate driving of the display can save, for example, almost 80% of driving power for the display at 1 Hz compared to that at 60 Hz, which can greatly help enhance the battery life of an electronic device having the display. Additionally, reduced refresh rate diving driving might also obviate the need to apply black or display OFF to, for example, watch screens when not used actively.

However, use of reduced refresh rate driving can be accompanied by visual artifacts. One such side effect is flicker, which can be perceived because of brightness variations on the display within the same frame for the same refresh rate. Sources of brightness variation may be addressed to reduce the generation of visual artifacts on the display. One such source of brightness variation is leakage of the voltage stored in the storage capacitor of a display pixel though the switch transistor. This brightness variation can be addressed by choosing low leakage switch transistors like the Oxide thin film transistors (TFT), for example, an Indium Gallium Zinc Oxide TFT, as well as utilizing a stack up structure which combines low temperature poly-silicon (LTPS) and Oxide TFTs to increase the efficacy of a display that is utilizing reduced refresh rate driving. The combined TFT structure a LED display using both LTPS and Oxide TFTs may be referred to as a display pixel having an LTPO structure.

To ensure that the LED display achieves good black levels and allows for the elimination of anode charging flicker, for example, for low grey level at low refresh rates, reset of the voltage at an anode of the LED may be continuously reset at a rate (e.g., at a rate of 60 Hz, 30 Hz, 15 Hz, etc.) that is higher than that of the data refresh rate (e.g., less than 10 Hz). This resetting of the voltage at the anode of the LED at a higher frequency will cause a user not to detect changes (flicker) due to the anode voltage reset being performed at a the prescribed rate and can allow for true black to be achieved while maintaining a low refresh rate for the LED display.

To help illustrate, a computing device 10 that may utilize a display 12 to display image frames is described in FIG. 1. As will be described in more detail below, the computing device 10 may be any suitable computing device, such as a handheld computing device, a tablet computing device, a notebook computer, and the like.

Accordingly, as depicted, the computing device 10 includes the display 12, input structures 14, input/output (I/O) ports 16, one or more processor(s) 18, memory 20, a non-volatile storage device 22, a network interface 24, and a power source 26. The various components described in FIG. 1 may include hardware elements (e.g., circuitry), software elements (e.g., a tangible, non-transitory computer-readable medium storing industrious), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the memory 20 and the non-volatile storage device 22 may be included in a single component.

As depicted, the processor 18 is operably coupled with memory 20 and/or the non-volatile storage device 22. More specifically, the processor 18 may execute instruction stored in memory 20 and/or non-volatile storage device 22 to perform operations in the computing device 10, such as generating and/or transmitting image data to the electronic display 12. As such, the processor 18 may include one or more general purpose microprocessors, one or more application specific processors (ASICs), one or more field programmable logic arrays (FPGAs), or any combination thereof.

Additionally, the memory 20 and the non-volatile storage device 22 may be tangible, non-transitory, computer-readable mediums that store instructions executable by and data to be processed by the processor 18. For example, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Furthermore, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11× Wi-Fi network, and/or a wide area network (WAN), and such as a 4G or LTE cellular network. Furthermore, as depicted, the processor 18 is operably coupled to the power source 26, which may provide power to the various components in the computing device 10, such as the display 12. As such, the power source 26 may include any suitable source of energy, such as a rechargeable lithium polymer (Li-poly) battery and/or an alternating current (AC) power converter.

As depicted, the processor 18 is also operably coupled with 110 ports 16, which may allow the computing device 10 to interface with various other electronic devices, and input structures 14, which may allow a user to interact with the computing device 10. Accordingly, the inputs structures 14 may include buttons, keyboards, mice, trackpads, and the like. Additionally, the display 12 may include touch components that facilitate user inputs by detecting occurrence and/or position of an object touching its screen (e.g., surface of the display 12).

In addition to enabling user inputs, the display 12 presents visual representations by displaying display image frames, such as a graphical user interface (GUI) for an operating system, an application interface, a still image, or video content. As depicted, the display 12 is operably coupled to the processor 18. Accordingly, image frames displayed by the display 12 may be based on image data received from the processor 18. As will be described in more detail below, in some embodiments, the display 12 may display image frames by controlling supply current flowing into one or more display pixels.

Figure 2:
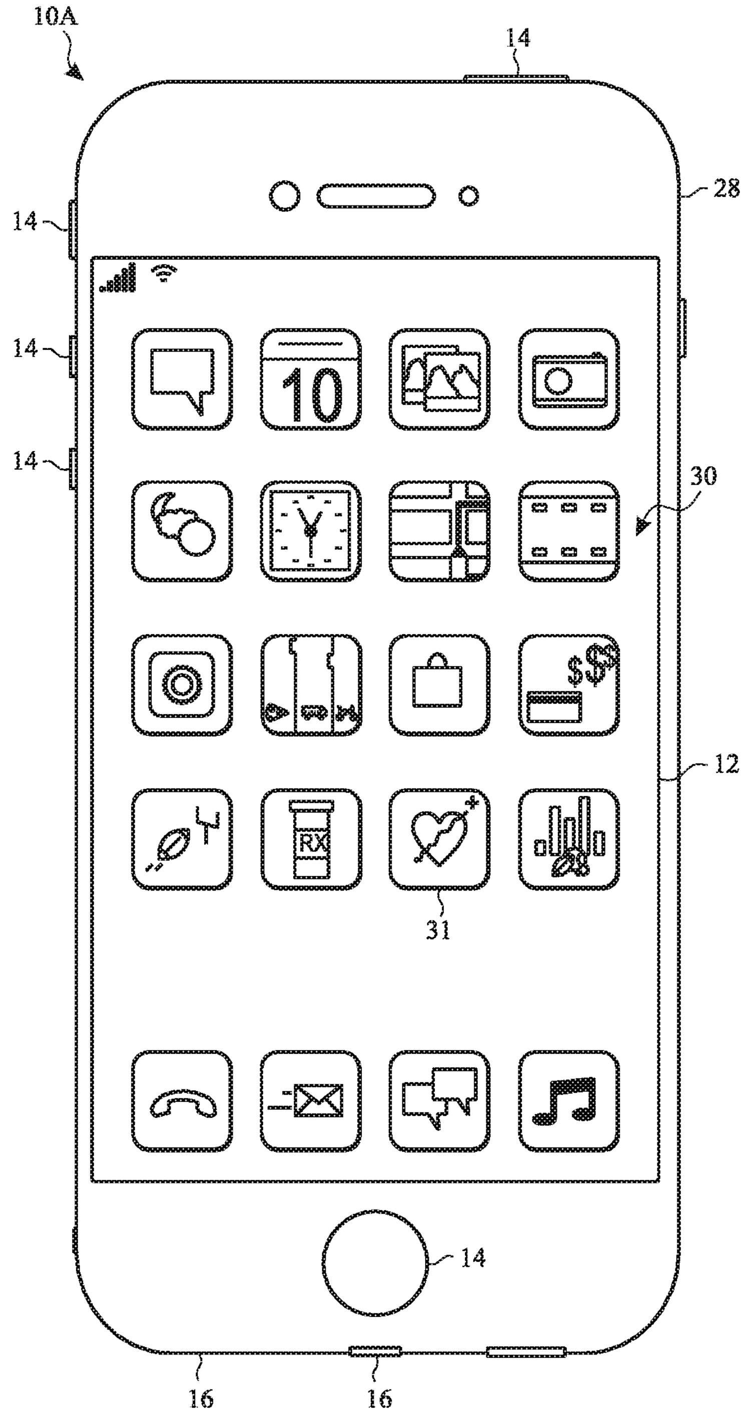
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the display 12, which, in the depicted embodiment, displays a graphical user interface (GUI) 30 having an array of icons 31. By way of example, when an icon 31 is selected either by an input structure 14 or a touch component of the display 12, an application program may launch.

Additionally, as depicted, input structure 14 may open through the enclosure 28. As described above, the input structures 14 may allow a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack to connect to external devices.

Figure 3:
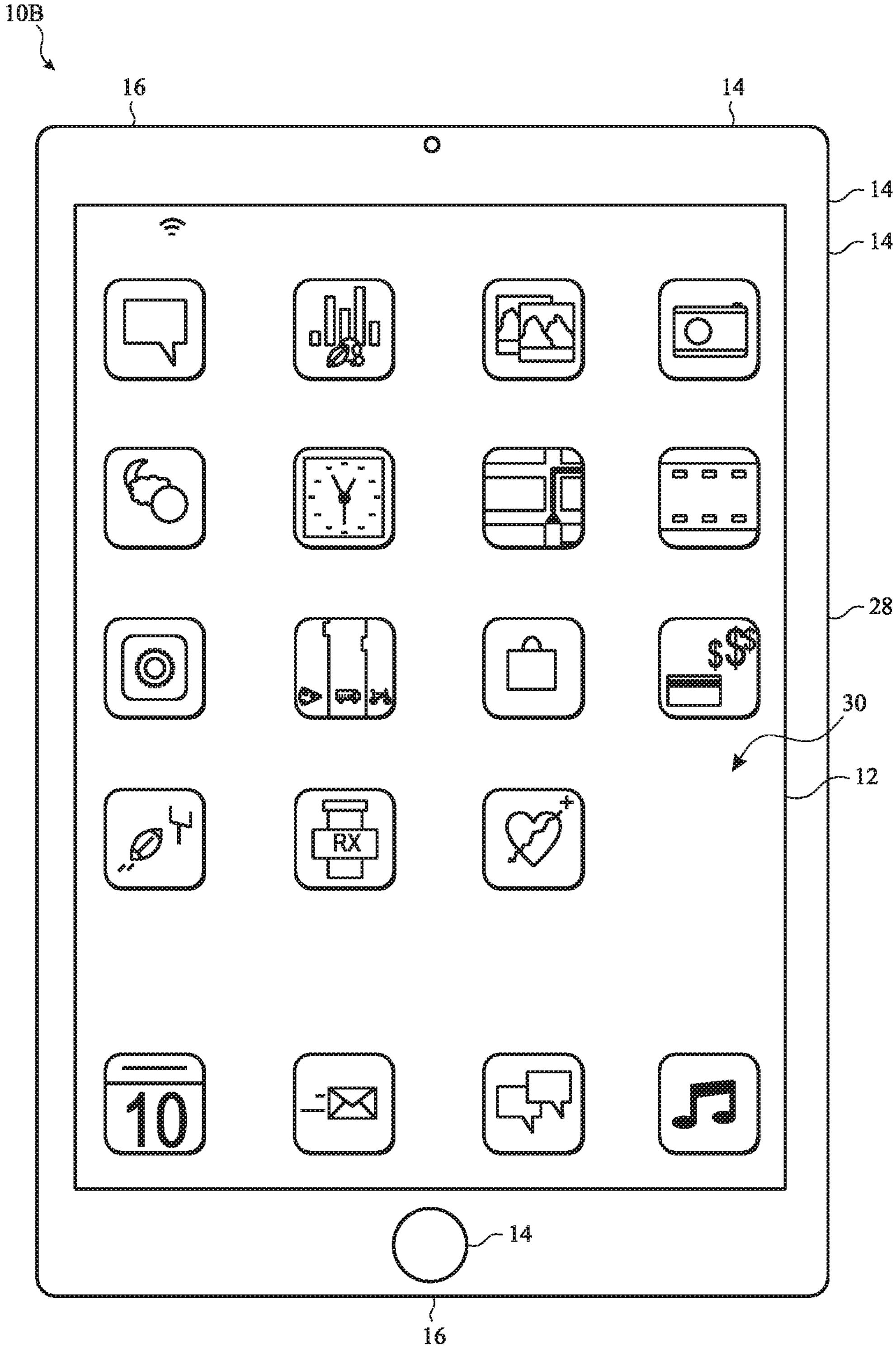
FIG. 3 is an example of the electronic device of FIG. 1, in accordance with an embodiment.
Figure 4:
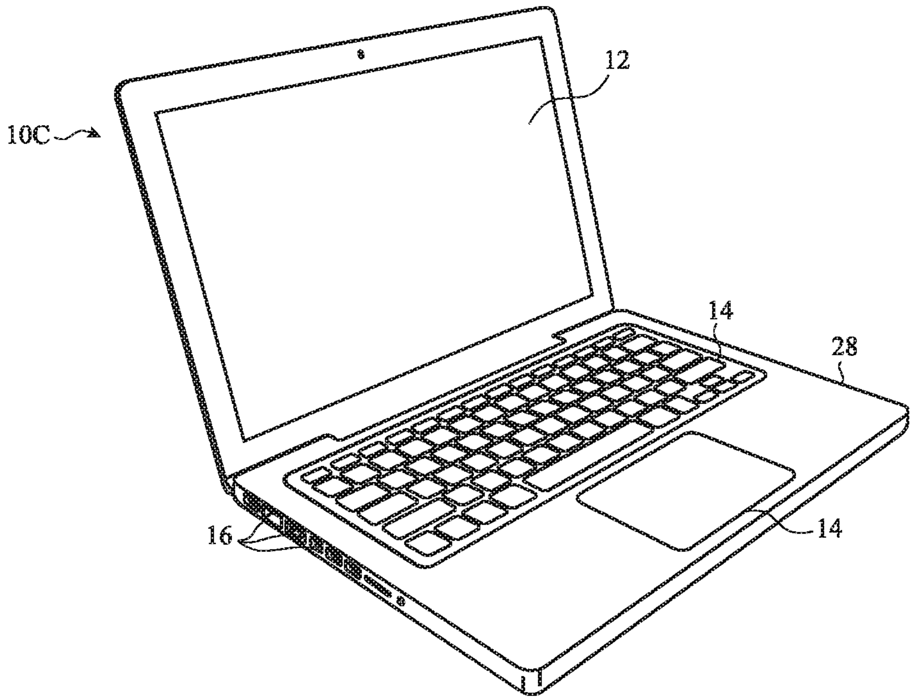
FIG. 4 is an example of the electronic device of FIG. 1, in accordance with an embodiment.
Figure 5:
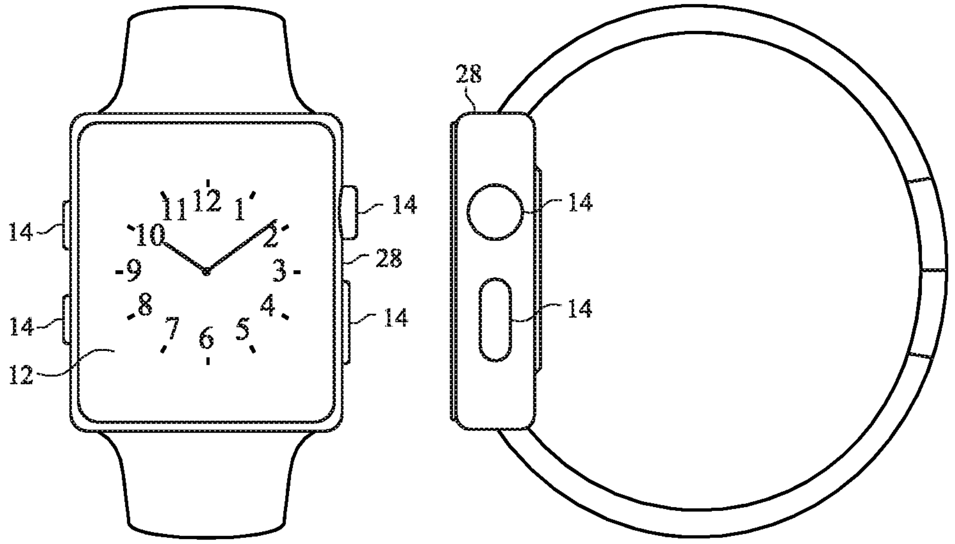
FIG. 5 is an example of the electronic device of FIG. 1, in accordance with an embodiment.

To further illustrate a suitable computing device 10, a tablet device 10B is described in FIG. 3, such as any iPad® model available from Apple Inc. Additionally, in other embodiments, the computing device 10 may take the form of a computer 10C as described in FIG. 4, such as any Macbook® or iMac® model available from Apple Inc. Furthermore, in other embodiments, the computing device 10 may take the form of a watch 10D as described in FIG. 5, such as an Apple Watch® model available from Apple Inc. As depicted, the tablet device 10B, the computer 10C, and the watch 10D may each also include an electronic display 12, input structures 14, I/O ports 16, an enclosure 28, or any combination thereof.

As described above, the computing device 10 may include a display 12 to facilitate presenting visual representations to one or more users. Accordingly, the display 12 may be any one of various suitable types. For example, in some embodiments, the electronic display 12 may be an LED display, such as an AMOLED display, a μLED, a PMOLED display, or the like. Although operation may vary, some operational principles of different types of displays 12 may be similar. For example, displays 12 may generally display image frames by controlling luminance of their display pixels based on received image data.

Figure 6:
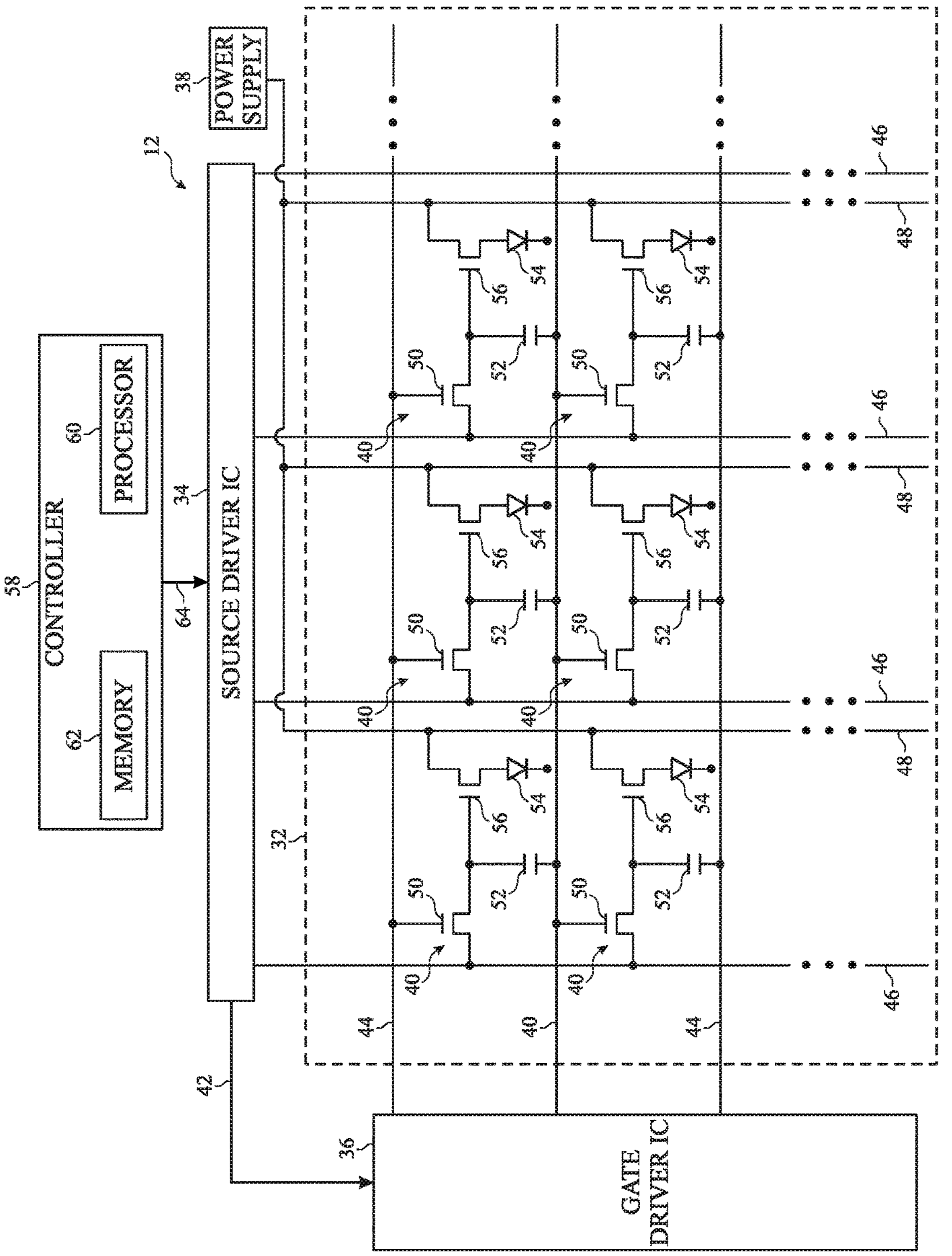
FIG. 6 is block diagram of an light emitting diode (LED) electronic display, in accordance with an embodiment.

To help illustrate, one embodiment of a display 12 is described in FIG. 6. As depicted, the display 12 includes a display panel 32, a source driver 34, a gate driver 36, and a power supply 38. Additionally, the display panel 32 may include multiple display pixels 40 arranged as an array or matrix defining multiple rows and columns. For example, the depicted embodiment includes a six display pixels 40. It should be appreciated that although only six display pixels 40 are depicted, in an actual implementation the display panel 32 may include hundreds or even thousands of display pixels 40.

As described above, display 12 may display image frames by controlling luminance of its display pixels 40 based at least in part on received image data. To facilitate displaying an image frame, a timing controller may determine and transmit timing data 42 to the gate driver based at least in part on the image data. For example, in the depicted embodiment, the timing controller may be included in the source driver 34. Accordingly, in such embodiments, the source driver 34 may receive image data that indicates desired luminance of one or more display pixels 40 for displaying the image frame, analyze the image data to determine the timing data 42 based at least in part on what display pixels 40 the image data corresponds to, and transmit the timing data 42 to the gate driver 36. Based at least in part on the timing data 42, the gate driver 36 may then transmit gate activation signals to activate a row of display pixels 40 via a gate line 44.

When activated, luminance of a display pixel 40 may be adjusted by image data received via data lines 46. In some embodiments, the source driver 34 may generate the image data by receiving the image data and voltage of the image data. The source driver 34 may then supply the image data to the activated display pixels 40. Thus, as depicted, each display pixel 40 may be located at an intersection of a gate line 44 (e.g., scan line) and a data line 46 (e.g., source line). Based on received image data, the display pixel 40 may adjust its luminance using electrical power supplied from the power supply 38 via power supply lines 48.

As depicted, each display pixel 40 includes a circuit switching thin-film transistor (TFT) 50, a storage capacitor 52, an LED 54, and a driving TFT 56 (whereby each of the storage capacitor 52 and the LED 54 may be coupled to a common voltage, Vcom). However, variations of display pixel 40 may be utilized in place of display pixel 40 of FIG. 6. As will be discussed in greater detail below, display pixels 40 from FIGS. 7, 10, 12, 13, 14, 15, 16, and 17 may be utilized in conjunction with the display panel 32 in place of the display pixels 40 of FIG. 6. Returning to the display pixel 40 of FIG. 6, to facilitate adjusting luminance, the driving TFT 56 and the circuit switching TFT 50 may each serve as a switching device that is controllably turned on and off by voltage applied to its respective gate. In the depicted embodiment, the gate of the circuit switching TFT 50 is electrically coupled to a gate line 44. Accordingly, when a gate activation signal received from its gate line 44 is above its threshold voltage, the circuit switching TFT 50 may turn on, thereby activating the display pixel 40 and charging the storage capacitor 52 with image data received at its data line 46.

Additionally, in the depicted embodiment, the gate of the driving TFT 56 is electrically coupled to the storage capacitor 52. As such, voltage of the storage capacitor 52 may control operation of the driving TFT 56. More specifically, in some embodiments, the driving TFT 56 may be operated in an active region to control magnitude of supply current flowing from the power supply line 48 through the LED 54. In other words, as gate voltage (e.g., storage capacitor 52 voltage) increases above its threshold voltage, the driving TFT 56 may increase the amount of its channel available to conduct electrical power, thereby increasing supply current flowing to the LED 54. On the other hand, as the gate voltage decreases while still being above its threshold voltage, the driving TFT 56 may decrease amount of its channel available to conduct electrical power, thereby decreasing supply current flowing to the LED 54. In this manner, the display 12 may control luminance of the display pixel 40. The display 12 may similarly control luminance of other display pixels 40 to display an image frame.

As described above, image data may include a voltage indicating desired luminance of one or more display pixels 40. Accordingly, operation of the one or more display pixels 40 to control luminance should be based at least in part on the image data. In the display 12, a driving TFT 56 may facilitate controlling luminance of a display pixel 40 by controlling magnitude of supply current flowing into its LED 54. Additionally, the magnitude of supply current flowing into the LED 54 may be controlled based at least in part on voltage supplied by a data line 46, which is used to charge the storage capacitor 52.

The display 12 of FIG. 6 also includes a controller 58. The source driver 34 may receive image data from an image source, such the controller 58, the processor 18, a graphics processing unit, a display pipeline, or the like. Additionally, the controller 58 may generally control operation of the source driver 34 and/or other portions of the display 12. To facilitate control operation of the source driver 34 and/or other portions of the display 12, the controller 58 may include a controller processor 60 and controller memory 62. More specifically, the controller processor 60 may execute instructions and/or process data stored in the controller memory 62 to control operation in the display 12. Accordingly, in some embodiments, the controller processor 60 may be included in the processor 18 and/or in separate processing circuitry and the memory 62 may be included in memory 20 and/or in a separate tangible non-transitory computer-readable medium. Furthermore, in some embodiments, the controller 58 may be included in the source driver 34 (e.g., as a timing controller) or may be disposed as separate discrete circuitry internal to a common enclosure with the display 12 (or in a separate enclosure from the display 12). Additionally, the controller 58 may be a digital signal processor (DSP), an application-specific integrated circuit (ASIC), or an additional processing unit.

Furthermore, the controller processor 60 may interact with one or more tangible, non-transitory, machine-readable media (e.g., memory 62) that stores instructions executable by the controller to perform the method and actions described herein. By way of example, such machine-readable media can include RAM, ROM, EPROM, EEPROM, or any other medium which can be used to carry or store desired program code in the form of machine-executable instructions or data structures and which can be accessed by the controller processor 60 or by any processor, controller, ASIC, or other processing device of the controller 58.

The controller 58 may receive information related to the operation of the display 12 and may generate an output 64 that may be utilized to control operation of the display pixels 40. For example, the controller 58 may receive an indication of the refresh rate of the display 12 or may receive an indication of a desired refresh rate of the display 12 (e.g., the frequency at which data is written fully into the array of display pixels 40 of the display and/or repeated in the array of display pixels 40). This indication of the refresh rate of the display 12 or a desired refresh rate of the display 12 may be part of a reduced rate for the display 12 that indicates a reduction in the display 12 refresh rate from, for example, 60 Hz to 30 Hz, 15 Hz, 10 Hz, or even lower frequencies. Accordingly, the controller 58 may alter its output 64 based on the indications of reduced refresh rate driving of the display 12. Similarly, the controller 58 may alter its output 64 based on the indications of a desired reduced refresh rate for the display 12 (e.g., received from processor 18), for example, if the refresh rate of the display 12 is to be controlled by controller 58. The output 64 may be utilized to generate, for example, control signals in the source driver 34 for control of the display pixels 40.

To produce output 64, the controller 58 may, for example, store the received indications of the desired reduced refresh rate of the display 12 in the memory 62. The controller 58 may also determine the desired reduced refresh rate of the display 12 (and/or the current refresh rate of the display 12) to calculate (determine) one or more emission control (EM) outputs and/or additional control signals as the output 64. Any generated EM outputs may be utilized by the source driver 34 to generate one or more EM signals to be input to a display pixel 40 of the display. Alternatively, the controller 58 may generate the EM output(s) (e.g., signals) to be input to a display pixel 40 directly for transmission to a display pixel 40 via the source driver 34. The EM output(s), as well as additional and/or alternative control signals may be determined and generated by the controller 58 to selectively minimize generation of artifacts and/or achieve desirable black levels by the display 12 in conjunction with a reduced refresh rate of the display 12.

Figure 7:
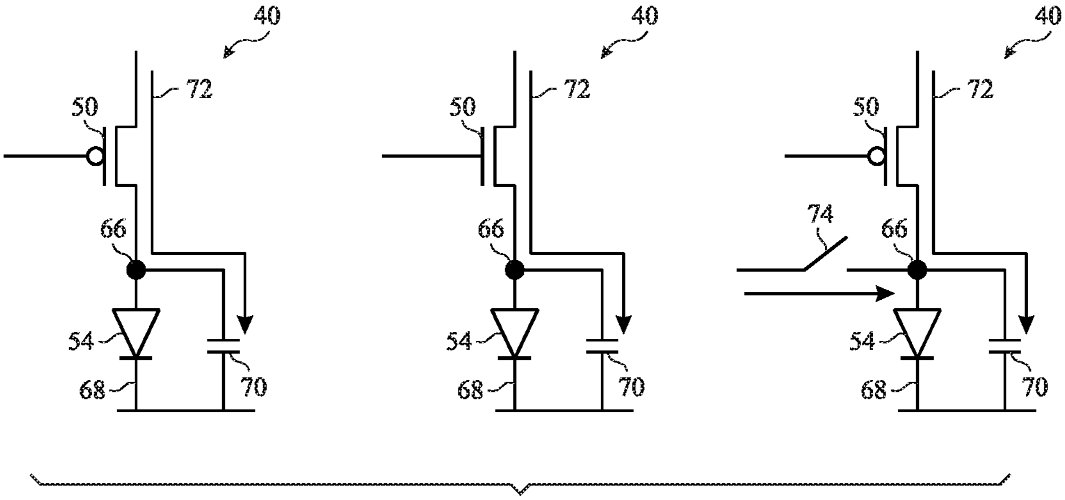
FIG. 7 is a block diagram of a first embodiment of display pixels for use with the LED electronic display of FIG. 6, in accordance with an embodiment.

FIG. 7 illustrates three embodiments of a display pixel 40 that may be controlled by the output 64 from controller 58 (either directly or via the source driver 34). The display pixels 40 of FIG. 7 each include the circuit switching TFT 50, either as a P-type TFT (activated by an active low gate signal to transmit the source value to the drain) or an N-type TFT (activated as by an active low gate signal to transmit the source value to the drain). Also illustrated is the LED 54, having an anode 66 coupled to the drain of the circuit switching TFT 50 and a cathode 68 coupled to, for example, a common voltage, Vcom. Also illustrated in FIG. 7 is a parasitic capacitance of the LED 54 as LED capacitor 70. In operation, a leakage current 72 (e.g., especially as temperatures increase) of the current switching TFT 50 may be present, which can continuously charge the anode 66 (e.g., the LED capacitor 70) such that the voltage at the anode 66 approaches a turn-on voltage for the LED 54. Once the voltage at the anode 66 is equal to or greater than the turn-on voltage for the LED 54, emission of light from the LED 54 will occur. Accordingly, in some embodiments, a switch 74 may be utilized to reset the voltage at the anode 66 to a predetermined value below the turn-on voltage for the LED 54. Operation of the switch 74 and the effects generated therefrom will be discussed in greater detail with respect to FIG. 8.

Figure 8:
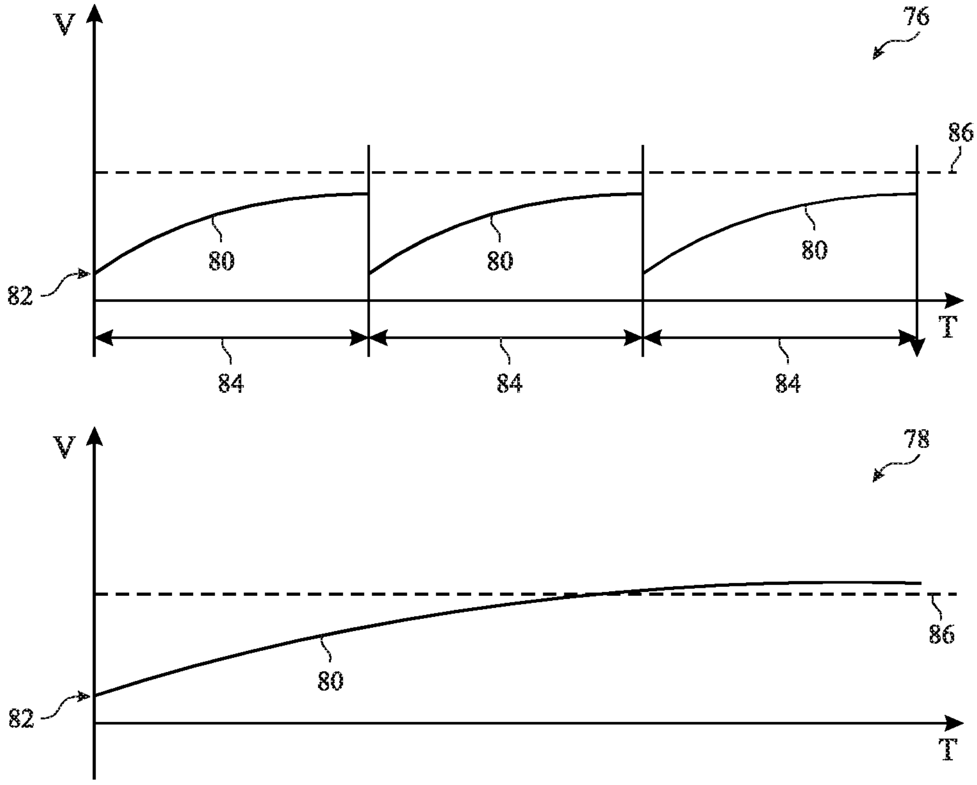
FIG. 8 illustrates graphs of changes in voltage of an LED of the electronic display of FIG. 6 during a first and a second refresh period of the LED, in accordance with an embodiment.

FIG. 8 illustrates a graph 76 and a graph 78 of changes in the voltage of an LED 54 utilizing the switch 74. In graph 76, closing of the switch 74 may cause the voltage 80 of the anode 66 to be reset to a predetermined anode reset voltage level 82. In some embodiments, the closing of the switch 74 may correspond to the (frame) refresh rate of the display 12 (e.g., 60 Hz), such that the voltage 80 of the anode 66 is reset to the predetermined anode reset voltage level 82 at a common frequency with the refresh rate of the display 12 (e.g., illustrated by time period 84). As illustrated in graph 76, this resetting of the voltage 80 of the anode 66 prior to the voltage 80 of the anode 66 equaling and/or exceeding the turn-on voltage 86 for the LED 54 can aid in achieving desirable black levels by the display 12 (since voltage 80 of the anode 66 is reset to the anode reset voltage level 82 prior to reaching and/or exceeding the turn-on voltage 86 for the LED 54, which prevents emission of light due to the leakage current 72). Once the voltage 80 of the anode 66 is reset to the anode reset voltage level 82, the switch 74 may be opened again and remain open until another time period 84 equivalent to the refresh rate of the display 12 has elapsed.

As further illustrated in graph 78 of FIG. 8, if the refresh rate of the display 12 is reduced (e.g., to 20 Hz, 15 Hz, 10 Hz, or less), correlating activation of the switch 74 to the refresh rate of the display 12 will cause the voltage 80 of the anode 66 to exceed the turn-on voltage 86 for the LED 54, which allows emission of light due to the leakage current 72. That is, as the number of display refreshes per period of time (e.g., per second) is reduced, the time in which the leakage current 72 accumulates voltage 80 at the anode 66 is increased. This may lead to diminished black levels for the display 12 in conjunction with the reduced refresh rate of the display 12, (i.e., the display contrast ratio, defined as the ratio of the luminance of the brightest color (white) to that of the darkest color (black) that the display 12 is capable of producing, will be degraded).

Figure 9:
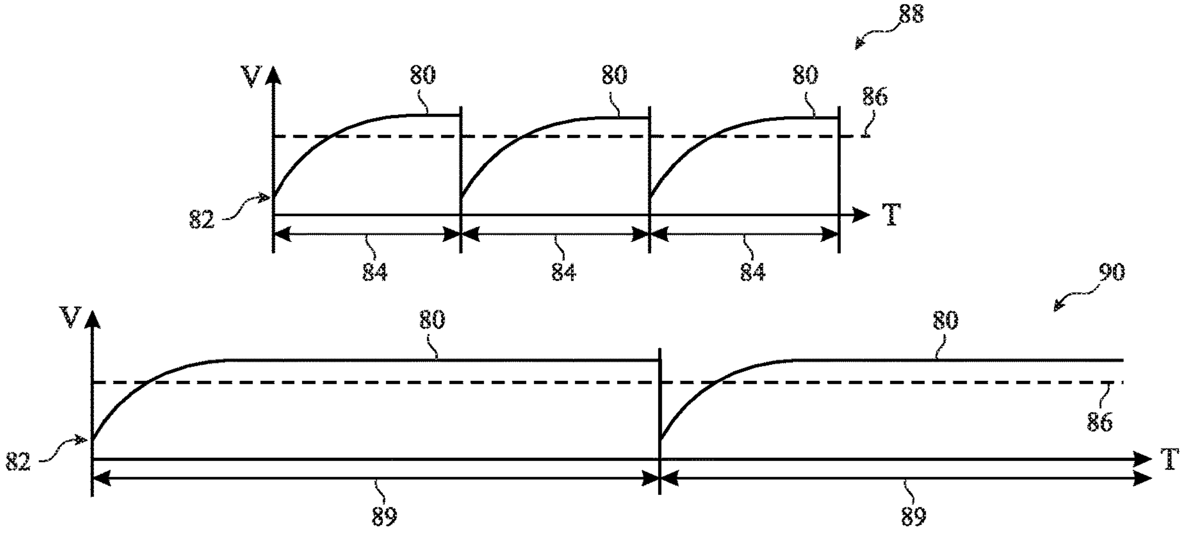
FIG. 9 illustrates graphs of second changes in voltage of an LED of the electronic display of FIG. 6 during a first and a second refresh period of the LED, in accordance with an embodiment.

FIG. 9 illustrates additional graphs 88 and 90 of changes in the voltage 80 at the anode 66 of an LED 54 utilizing the switch 74 when low grey level images are being displayed on display 12. In a low grey level case, emission current is very small, so charging the LED capacitor 70 to real operation voltage takes a relatively long time (e.g., approximately one quarter, one third, or one half of the time period 84 at which the display 12 is refreshed when the refresh rate is at 30 Hz or 60 Hz). Accordingly, any differences between the voltage 80 at the anode 66 of the LED 54, as illustrated in graph 88, prior to and subsequent to reset (e.g., flicker) is not readily perceivable by a user when the time period 84 corresponds to a refresh rate of, for example, 30 Hz or 60 Hz. However, if the refresh rate of the display 12 is reduced (e.g., to 20 Hz, 15 Hz, 10 Hz, or less), as illustrated in conjunction in graph 90, correlating activation of the switch 74 to the refresh rate of the display 12 will cause flicker to be observed (e.g., due to the amount of time that the voltage 80 at the anode 66 of the LED 54 is above the turn-on voltage 86 for the LED 54 for a refresh rate of the display 12 corresponding to time period 89). As the number of display refreshes per period of time (e.g., per second) is reduced, the time in which the leakage current 72 accumulates voltage 80 at the anode 66 is increased and a reset of the voltage 80 to the predetermined anode reset voltage level 82 will be noticeable to a user as a visual artifact (e.g., flicker).

Figure 10:
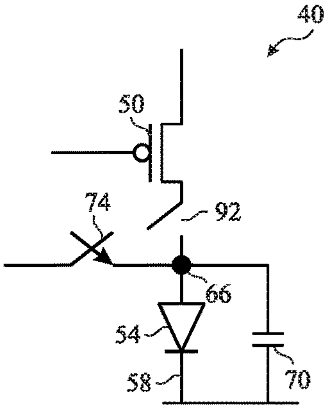
FIG. 10 is a block diagram of a second embodiment of display pixels for use with the LED electronic display of FIG. 6, in accordance with an embodiment.

To alleviate the potential issues of diminished black levels for the display 12 in conjunction with the reduced refresh rate of the display 12 and/or flicker associated with flicker accompanying a reduced refresh rate of the display 12 when low grey level images are being displayed on display 12, predetermined activation and deactivation (e.g., control) of the switches 74 and 92 of the display pixel 40 of FIG. 10 may be undertaken. Additionally, the techniques described with respect to the display pixel 40 of FIG. 10 may also be applied to the display pixel 40 of FIG. 7. In one embodiment, a control signal for activation/deactivation of each switch of the display pixel 40 (e.g., switch 74 and/or switch 74 and 92) may correspond to the refresh rate of the display 12 at certain predetermined refresh rate frequencies of the display 12 and may differ from the refresh rate of the display 12 at certain other predetermined frequencies refresh rate frequencies of the display 12. Detection of changes to the refresh rate of the display 12 may be determined by the controller 58, changes to the refresh rate of the display 12 may be transmitted to the controller 58 as an input (e.g., a signal used by the controller 58 to adjust control of one or more portions of the display pixel 40 and/or the signals being transmitted thereto), and/or degradation of performance of the display 12 (e.g., increases in black levels and/or flicker) may be detected and one or more indications thereof may be transmitted to the controller 58 as an input that will cause the controller 58 to alter the control of each switch of the display pixel 40 (e.g., switch 74 and/or switch 74 and 92) to change the frequency at which the voltage 80 is reset to the anode reset voltage level 82.

For example, each switch of the display pixel 40 (e.g., switch 74 and 92) may be controlled by the output 64 from controller 58 (either directly or via the source driver 34). The controller 58 may determine the refresh rate of the display 12. If the refresh rate of the display 12 is at or above a predetermined frequency, the controller 58 may transmit one or more signals to control the each switch of the display pixel 40 (e.g., switch 74 and 92) to match activation and/or deactivation of the respective switch (e.g., switch 74 and 92) to the refresh rate of the display 12. For example, the activation and/or deactivation of the respective switch (e.g., switch 74 and 92) may be synched to the refresh rate of the display 12 such that the respective switch (e.g., switch 74 and 92) resets the voltage 80 to the anode reset voltage level 82 when an image (e.g., an image frame) of the display 12 is refreshed (e.g., at the same time as the refresh of the display 12). The controller 58 may match the activation and/or deactivation of the respective switch (e.g., switch 74 and 92) to the refresh rate of the display 12 when the refresh rate of the display 12 is at and/or above, for example, 15 Hz, 30 Hz, 60 Hz, or another value.

Additionally, the controller 58 may determine when the refresh rate of the display 12 is at and/or below a predetermined frequency. For example, the controller may determine that the refresh rate of the display 12 is a reduced refresh rate of at or below 1 Hz, 5 Hz, 10 Hz, 15 Hz, 20 Hz, or 30 Hz as the predetermined frequency. When the controller 58 determines that the refresh rate of the display 12 is a reduced refresh rate (at and/or below a predetermined frequency), the controller 58 may transmit one or more signals to control the each switch of the display pixel 40 (e.g., switch 74 and 92) to differ the timing of the activation and/or deactivation of the respective switch (e.g., switch 74 and 92) from the refresh rate of the display 12. For example, the activation and/or deactivation of the respective switch (e.g., switch 74 and 92) may be controlled to occur at a multiple of the frequency of the reduced refresh rate of the display 12 (e.g., 1.5×, 2×, 3×, 5×, 6×, 10×, 15×, 20×, 30×, etc., where "×" is the frequency of the reduced refresh rate of the display 12) and/or at a predetermined rate greater than the reduced refresh rate of the display 12 (e.g., at 15 Hz, 30 Hz, 60 Hz, etc.), such that the respective switch (e.g., switch 74 and 92) resets the voltage 80 to the anode reset voltage level 82 more frequently than the display 12 is refreshed (e.g., more than once per refresh period of the display 12). The controller 58 may increase the number of times of the activation and/or deactivation of the respective switch (e.g., switch 74 and 92) to reset the voltage 80 to the anode reset voltage level 82 relative to the refresh rate of the display 12 when the refresh rate of the display 12 is at and/or below, for example, 30 Hz, 15 Hz, 10 Hz, 5 Hz, 2 Hz, 1 Hz, or another value.

Figure 11:
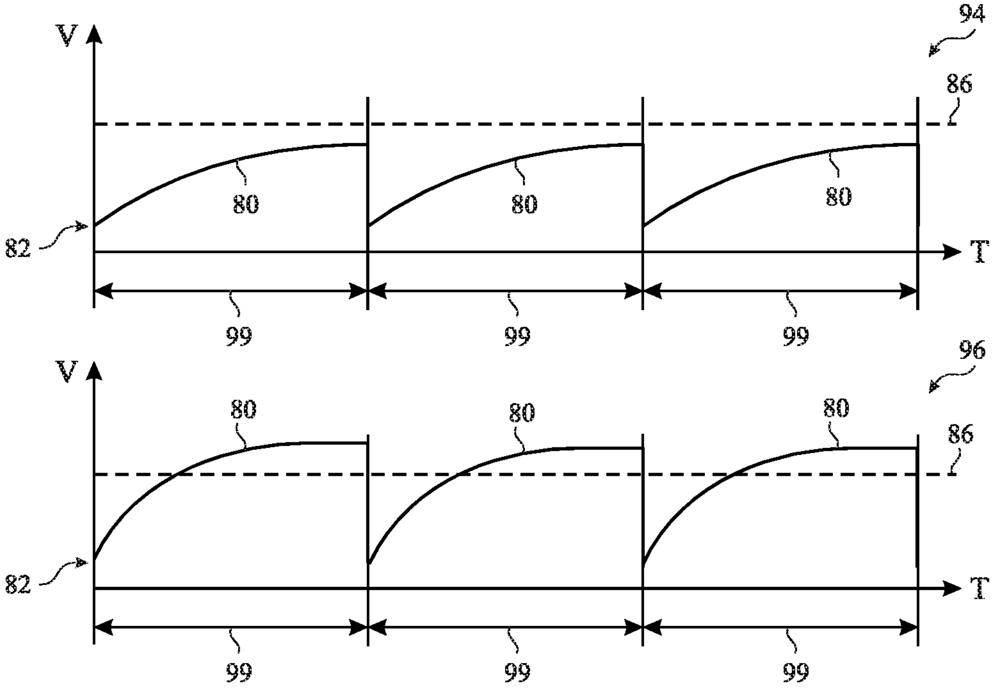
FIG. 11 illustrates graphs of third changes in voltage of an LED of the electronic display of FIG. 6 during a first and a second refresh period of the LED, in accordance with an embodiment.

FIG. 11 illustrates a graph 94 and a graph 96 of changes in the voltage of an LED 54 utilizing the switch 74 (illustrated in FIG. 7) or the switches 74 and 92 (in FIG. 10). In graph 94, closing of the switch 74 (or selective activation/deactivation of the switches 74 and 92) may cause the voltage 80 of the anode 66 to be reset to a predetermined anode reset voltage level 82. In some embodiments, the closing of the switch 74 (or selective activation/deactivation of the switches 74 and 92) may differ from the refresh rate of the display 12, as described above, when the controller 58 determines that the refresh rate of the display 12 is at and/or below a predetermined frequency. Accordingly, the controller 58 may cause the voltage 80 of the anode 66 to be reset to the predetermined anode reset voltage level 82 at a frequency (measured by time period 99) that exceeds the frequency of the refresh rate of the display 12, as illustrated in graph 94. For example, as illustrated in graph 94, the controller 58 may cause the voltage 80 of the anode 66 to be reset to the predetermined anode reset voltage level 82 at least three times prior to any refresh of the display 12. It should be noted that the frequency of the resetting of the voltage 80 of the anode 66 to the predetermined anode reset voltage level 82 may be selected by the controller 58 and/or may be set to a predetermined value to be applied by the controller 58, such that desired black levels of the display 12 may be achieved (e.g., the frequency of reset of the voltage 80 by the controller 58 may be selected to prevent the voltage 80 from reaching and/or exceeding the turn-on voltage 86 for the LED 54, which prevents emission of light due to the leakage current 72, as illustrated in graph 94), while still allowing for power consumption reductions through, for example, lower refresh rates of the display 12.

Likewise, as illustrated in graph 96 of FIG. 11, changes in the voltage 80 at the anode 66 of an LED 54 utilizing the switch 74 (or selective activation/deactivation of the switches 74 and 92) when low grey level images are being displayed on display 12 may be controlled by the controller 58. As previously discussed, in a low grey level case, emission current is very small, so charging the LED capacitor 70 to real operation voltage takes a relatively long time (e.g., approximately one quarter, one third, or one half of the time period 84 at which the display 12 is refreshed when the refresh rate, for example, 15 Hz, 30 Hz, or 60 Hz, as illustrated via time period 99). Accordingly, any differences between the voltage 80 at the anode 66 of the LED 54, as illustrated in graph 96, prior to and subsequent to reset (e.g., flicker) is not readily perceivable by a user when the time period 99 is selected by the controller 58 as corresponding to a predetermined frequency (e.g., 15 Hz, 30 Hz, 60 Hz, etc.)

Accordingly, similar to the process described above in conjunction with graph 94, closing of the switch 74 (or selective activation/deactivation of the switches 74 and 92) may cause the voltage 80 of the anode 66 to be reset to a predetermined anode reset voltage level 82, as illustrated in graph 96. In some embodiments, the closing of the switch 74 (or selective activation/deactivation of the switches 74 and 92) may differ from the refresh rate of the display 12 as described above, when the controller 58 determines that the refresh rate of the display 12 is at and/or below a predetermined frequency. Accordingly, the controller 58 may cause the voltage 80 of the anode 66 to be reset to the predetermined anode reset voltage level 82 at a frequency (measured by time period 99) that exceeds the frequency of the refresh rate of the display 12, as illustrated in graph 96. For example, as illustrated in graph 96, the controller 58 may cause the voltage 80 of the anode 66 to be reset to the predetermined anode reset voltage level 82 at least three times prior to any refresh of the display 12. It should be noted that the frequency of the resetting of the voltage 80 of the anode 66 to the predetermined anode reset voltage level 82 may be selected by the controller 58 and/or may be set to a predetermined value to be applied by the controller 58, such that flicker typically associated reduced refresh rates of a display 12 displaying low grey level images is reduced and/or eliminated (e.g., the frequency of reset of the voltage 80 by the controller 12 may be selected to prevent the voltage 80 from exceeding the turn-on voltage 86 for the LED 54 for longer than a predetermined amount of time, as illustrated in graph 94), while still allowing for power consumption reductions through, for example, lower refresh rates of the display 12.

Additional embodiments of the display pixel 40 which can be used to reduce flicker and/or achieve desired black levels for a display 12 when the display is operating at a low refresh rate (e.g., less than 30 Hz, 20 Hz, 15 Hz, 10 Hz, 5 Hz, 2 Hz, 1 Hz, etc.) are envisioned. FIGS. 12-17, described in greater detail below, each illustrate a particular configuration of the display pixel 40 that may be utilized in conjunction with the techniques described above.

Figure 12:
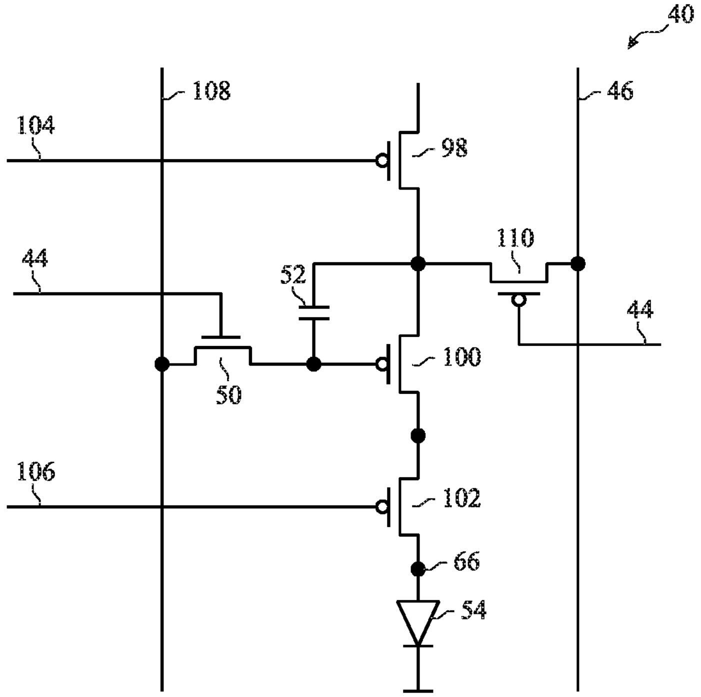
FIG. 12 is a block diagram of a third embodiment of a display pixel for use with the LED electronic display of FIG. 6, in accordance with an embodiment.

FIG. 12 illustrates a display pixel 40 that includes a circuit switching TFT 50, which may be a low leakage switch transistor, such as an Oxide TFT (e.g., an Indium Gallium Zinc Oxide TFT), the storage capacitor 52, an LED 54, and a stacked structure of high mobility TFTs 98, 100, and 102 (e.g., low temperature poly-silicon (LTPS) TFTs) as the driving TFTs for LED 54. The combination of the stacked high mobility TFTs 98, 100, and 102 with an Oxide TFT 50 in FIG. 12 may be also be referred to as an LTPO structure that allows the display 12 utilizing the LTPO structure to increase its efficacy when utilizing low refresh rate driving techniques. Additionally, as illustrated, one or more of the high mobility TFTs 98 and 102 (as emission enable TFTs) may each receive an emission control (EM) signal (EM1 signal 104 and EM2 signal 106, respectively) as a gate control signal, thus allowing for controller 58 to directly (or indirectly via the source driver 34) control the emission of the display pixel 40 as part of output 64. Alternatively, the controller 58 may generate EM1 signal 104 and EM2 signal 106 to be, separately from output 64, input to the display pixel 40 directly (or, for example, via the source driver 34). Likewise, the circuit switching TFT 50 may be coupled to a first gate line (scan line) 44 to receive a signal as a gate control signal as well as a reference voltage 108.

Additionally, the display pixel 40 of FIG. 12 may include TFT 110 that may be coupled to a second gate line (scan line) 44 to receive a signal as a gate control signal as well as a data line 46. In operation (e.g., at a low refresh rate of less than or equal to 30 Hz, 20 Hz, 15 Hz, 10 Hz, 5 Hz, 2 Hz, 1 Hz, etc.), the display pixel 40 of FIG. 12 may receive one or more control signals, for example, generated by controller 58. Between refreshes of the display 12, these control signals may operate to keep the first gate line (scan line) 44 and EM2 signal 106 low, for example, to hold an emission data voltage at a desired level. Likewise, the control signals may operate to provide a constant voltage at data line 46 while the second gate line (scan line) 44 (whereby TFT 110 operates as switch 74) and the EM1 signal 104 (whereby TFT 98 operates as switch 92) may be controlled to affect reset of the voltage 80 at anode 66 to, for example, to the anode reset voltage 82 at a predetermined rate (frequency) that differs from the refresh rate of the display 12 as described above with respect to FIG. 11.

For example, the EM1 signal 104 may be switched from low to high to turn off TFT 98 (e.g., to open switch 92) and the second gate line (scan line) 44 may be switched from high to low to turn on TFT 110 (e.g., to close switch 74) separate from any refresh commands to the display pixel 40. In this manner, the controller 58 may cause the voltage 80 of the anode 66 to be reset to the predetermined anode reset voltage level 82 at a frequency (e.g., measured by time period 99) that exceeds the frequency of the refresh rate of the display 12. Subsequent to the resetting of the voltage 80, the EM1 signal 104 may be switched from high to low to turn on TFT 98 (e.g., to close switch 92) and the second gate line (scan line) 44 may be switched from low to high to turn off TFT 110 (e.g., to open switch 74) until time to reset the voltage 80 again. By controlling the voltage 80 at anode 66, emission (caused by leakage current 72) by the LED 54 between refreshes of the display 12 may be controlled. Additional and/or alternative embodiments of circuitry for display pixel 40 may be used.

Figure 13:
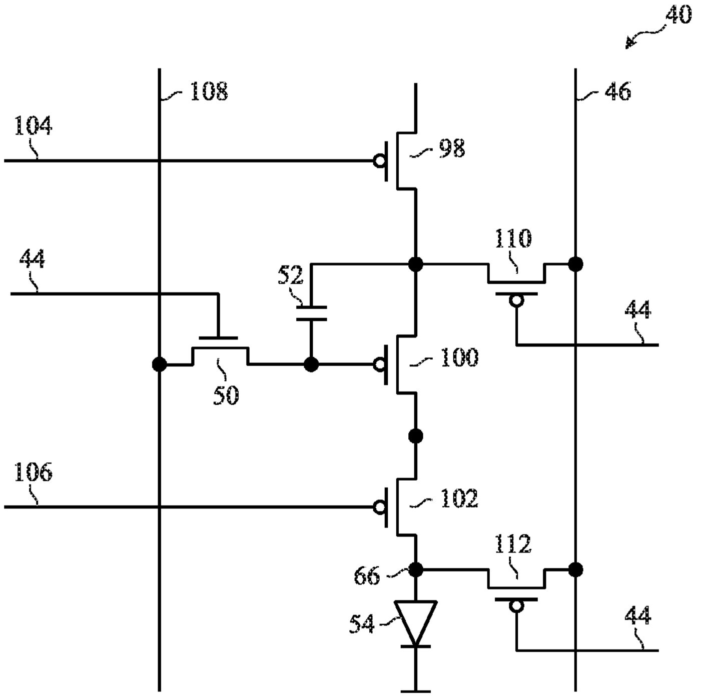
FIG. 13 is a block diagram of a fourth embodiment of a display pixel for use with the LED electronic display of FIG. 6, in accordance with an embodiment.

For example, FIG. 13 illustrates a display pixel 40 that includes circuit switching TFT 50, storage capacitor 52, LED 54, stacked structure of high mobility TFTs 98, 100, and 102 for LED 54, EM1 signal 104, EM2 signal 106, first gate line (scan line) 44, reference voltage 108, TFT 110, and second gate line (scan line) 44 similar to the display pixel 40 of FIG. 12. Additionally, the display pixel 40 of FIG. 13 includes an additional TFT 112 that may be coupled to a third gate line (scan line) 44 to receive a signal as a gate control signal as well as data line 46. In operation (e.g., at a low refresh rate of less than or equal to 30 Hz, 20 Hz, 15 Hz, 10 Hz, 5 Hz, 2 Hz, 1 Hz, etc.), the display pixel 40 of FIG. 13 may receive one or more control signals, for example, generated by controller 58. Between refreshes of the display 12, these control signals may operate to keep the first gate line (scan line) 44 and EM1 signal 104 signal low and the second gate line (scan line) 44 high, for example, to hold an emission data voltage at a desired level. Likewise, the control signals may operate to provide a constant voltage at data line 46 while the third gate line (scan line) 44 (whereby TFT 112 operates as switch 74) and the EM2 signal 106 (whereby TFT 102 operates as switch 92) may be controlled to affect reset of the voltage 80 at anode 66 to, for example, to the anode reset voltage level 82 at a predetermined rate that differs from the refresh rate of the display 12 as described above with respect to FIG. 11.

For example, the EM2 signal 106 may be switched from low to high to turn off TFT 102 (e.g., to open switch 92) and the third gate line (scan line) 44 may be switched from high to low to turn on TFT 112 (e.g., to close switch 74) separate from any refresh commands to the display pixel 40. In this manner, the controller 58 may cause the voltage 80 of the anode 66 to be reset to the predetermined anode reset voltage level 82 at a frequency (e.g., measured by time period 99) that exceeds the frequency of the refresh rate of the display 12. Subsequent to the resetting of the voltage 80, the EM2 signal 106 may be switched from high to low to turn on TFT 102 (e.g., to close switch 92) and the third gate line (scan line) 44 may be switched from low to high to turn off TFT 112 (e.g., to open switch 74) until time to reset the voltage 80 again. By controlling the voltage 80 at anode 66, emission (caused by leakage current 72) by the LED 54 between refreshes of the display 12 may be controlled. Additional and/or alternative embodiments of circuitry for display pixel 40 may be used.

Figure 14:
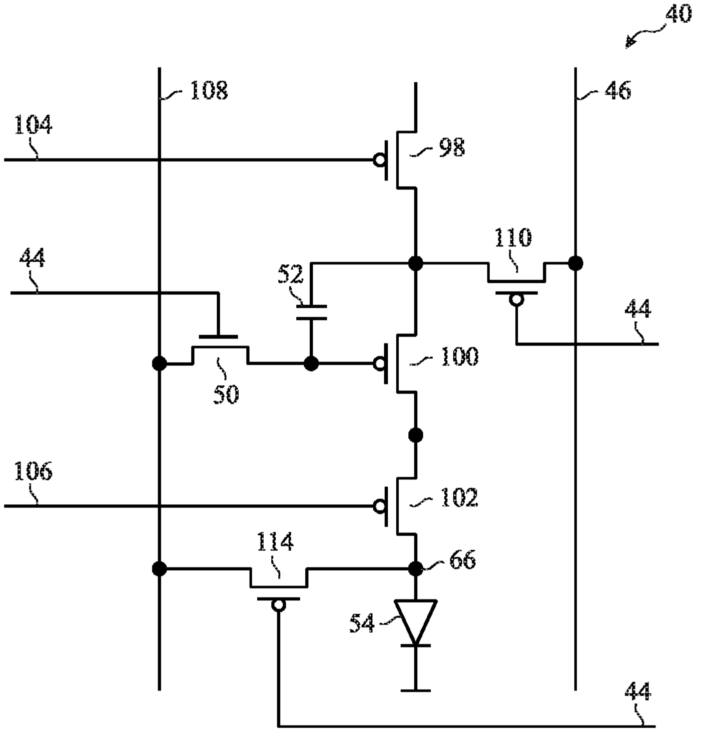
FIG. 14 is a block diagram of a fifth embodiment of a display pixel for use with the LED electronic display of FIG. 6, in accordance with an embodiment.

For example, FIG. 14 illustrates a display pixel 40 that includes circuit switching TFT 50, storage capacitor 52, LED 54, stacked structure of high mobility TFTs 98, 100, and 102 for LED 54, EM1 signal 104, EM2 signal 106, first gate line (scan line) 44, reference voltage 108, TFT 110, and second gate line (scan line) 44 similar to the display pixel 40 of FIG. 12. Additionally, the display pixel 40 of FIG. 14 includes an additional TFT 114 that that may be coupled to reference voltage 108 and a third gate line (scan line) 44, which may be a gate line adjacent to the second gate line 44 and may receive the same input value as the second gate line 44. In operation (e.g., at a low refresh rate of less than or equal to 30 Hz, 20 Hz, 15 Hz, 10 Hz, 5 Hz, 2 Hz, 1 Hz, etc.), the display pixel 40 of FIG. 14 may receive one or more control signals, for example, generated by controller 58. Between refreshes of the display 12, these control signals may operate to keep the first gate line (scan line) 44 and EM1 signal 104 signal low, for example, to hold an emission data voltage at a desired level. Likewise, the control signals may operate to provide a constant voltage at data line 46 and a constant voltage at reference voltage 108 while the third gate line (scan line) 44 (whereby TFT 114 operates as switch 74), the second gate line (scan line) 44, and the EM2 signal 106 (whereby TFT 102 operates as switch 92) may be controlled to affect reset of the voltage 80 at anode 66 to, for example, to the anode reset voltage level 82 at a predetermined rate that differs from the refresh rate of the display 12 as described above with respect to FIG. 11.

For example, the EM2 signal 106 may be switched from low to high to turn off TFT 102 (e.g., to open switch 92) and the third gate line (scan line) 44 may be switched from high to low to turn on TFT 114 (e.g., to close switch 74) as well as turn on TFT 110 separate from any refresh commands to the display pixel 40. In this manner, the controller 58 may cause the voltage 80 of the anode 66 to be reset to the predetermined anode reset voltage level 82 at a frequency (e.g., measured by time period 99) that exceeds the frequency of the refresh rate of the display 12. Subsequent to the resetting of the voltage 80, the EM2 signal 106 may be switched from high to low to turn on TFT 102 (e.g., to close switch 92) and the third gate line (scan line) 44 may be switched from low to high to turn off TFT 114 (e.g., to open switch 74) as well as turn on TFT 110 until time to reset the voltage 80 again. By controlling the voltage 80 at anode 66, emission (caused by leakage current 72) by the LED 54 between refreshes of the display 12 may be controlled. Additional and/or alternative embodiments of circuitry for display pixel 40 may be used.

Figure 15:
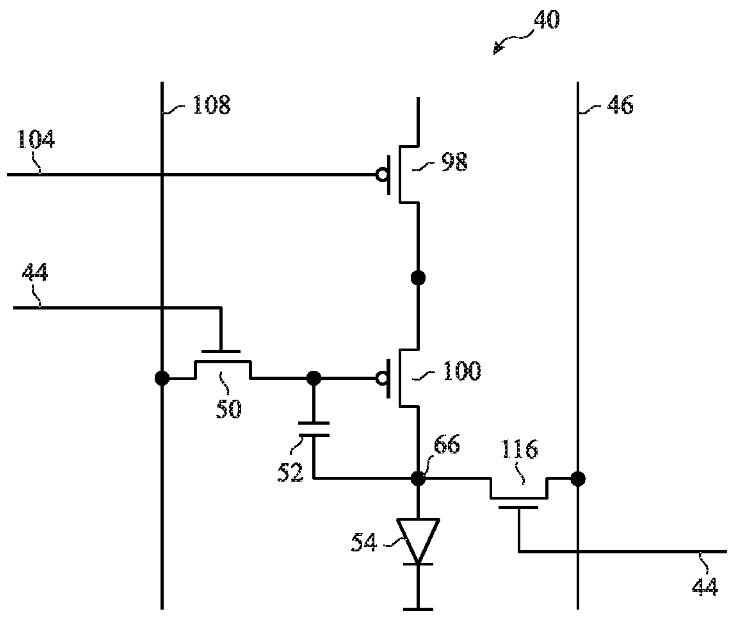
FIG. 15 is a block diagram of a sixth embodiment of a display pixel for use with the LED electronic display of FIG. 6, in accordance with an embodiment.

For example, FIG. 15 illustrates an embodiment of a display pixel 40 that includes the circuit switching TFT 50, which may be a low leakage switch transistor, such as an Oxide TFT (e.g., an Indium Gallium Zinc Oxide TFT), the storage capacitor 52, an LED 54, and a stacked structure of high mobility TFTs 98 and 100 (e.g., low temperature poly-silicon (LTPS) TFTs) as the driving TFTs for LED 54. The combination of the stacked high mobility TFTs 98 and 100 with an Oxide TFT 50 in FIG. 15 may be referred to as an LTPO structure that allows the display 12 utilizing the LTPO structure to increase its efficacy when utilizing low refresh rate driving. Additionally, as illustrated, the high mobility TFT 98 (as an emission enable TFT) may receive an EM signal, EM1 signal 104, as a gate control signal, thus allowing for controller 58 to directly (or indirectly via the source driver 34) control the emission of the display pixel 40. Likewise, the circuit switching TFT 50 may be coupled to a first gate line (scan line) 44 to receive a signal as a gate control signal as well as a reference voltage 108.

Additionally, the display pixel 40 of FIG. 15 may include TFT 116 that may be coupled to a second gate line (scan line) 44 to receive a signal as a gate control signal, as well as a data line 46. In operation (e.g., at a low refresh rate of less than or equal to 30 Hz, 20 Hz, 15 Hz, 10 Hz, 5 Hz, 2 Hz, 1 Hz, etc.), the display pixel 40 of FIG. 15 may receive one or more control signals, for example, generated by controller 58. Between refreshes of the display 12, these control signals may operate to keep the first gate line (scan line) 44 low, for example, to hold an emission data voltage at a desired level. Likewise, the control signals may operate to provide a constant voltage at data line 46 while the second gate line (scan line) 44 (whereby TFT 116 operates as switch 74) and the EM1 signal 104 (whereby TFT 98 operates as switch 92) may be controlled to affect reset of the voltage 80 at anode 66 to, for example, to the anode reset voltage level 82 at a predetermined rate that differs from the refresh rate of the display 12 as described above with respect to FIG. 11.

For example, the EM1 signal 104 may be switched from low to high to turn off TFT 98 (e.g., to open switch 92) and the second gate line (scan line) 44 may be switched from high to low to turn on TFT 116 (e.g., to close switch 74) separate from any refresh commands to the display pixel 40. In this manner, the controller 58 may cause the voltage 80 of the anode 66 to be reset to the predetermined anode reset voltage level 82 at a frequency (e.g., measured by time period 99) that exceeds the frequency of the refresh rate of the display 12. Subsequent to the resetting of the voltage 80, the EM1 signal 104 may be switched from high to low to turn on TFT 98 (e.g., to close switch 92) and the second gate line (scan line) 44 may be switched from low to high to turn off TFT 116 (e.g., to open switch 74) until time to reset the voltage 80 again. By controlling the voltage 80 at anode 66, emission (caused by leakage current 72) by the LED 54 between refreshes of the display 12 may be controlled. Additional and/or alternative embodiments of circuitry for display pixel 40 may be used.

Figure 16:
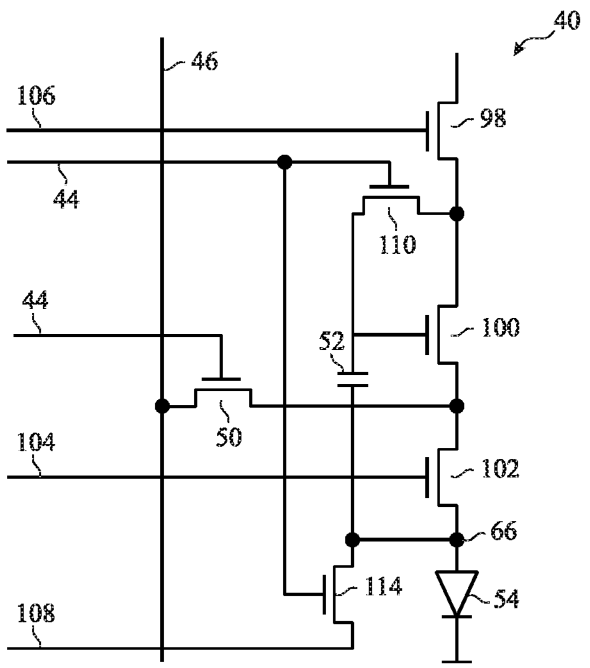
FIG. 16 is a block diagram of a seventh embodiment of a display pixel for use with the LED electronic display of FIG. 6, in accordance with an embodiment.

For example, FIG. 16 illustrates a display pixel 40 that includes circuit switching TFT 50, storage capacitor 52, LED 54, stacked structure of high mobility TFTs 98, 100, and 102 for LED 54, EM1 signal 104, EM2 signal 106, reference voltage 108, TFT 110, first gate line (scan line) 44 coupled to TFT 110 and second gate line (scan line) 44 coupled to circuit switching TFT 50. Additionally, the display pixel 40 of FIG. 16 includes an additional TFT 114 that that may be coupled to reference voltage 108 and the second gate line (scan line) 44. In operation (e.g., at a low refresh rate of less than or equal to 30 Hz, 20 Hz, 15 Hz, 10 Hz, 5 Hz, 2 Hz, 1 Hz, etc.), the display pixel 40 of FIG. 16 may receive one or more control signals, for example, generated by controller 58. Between refreshes of the display 12, these control signals may operate to keep the first gate line (scan line) 44 signal low, for example, to turn off the TFT 110 and the TFT 114. Likewise, the EM1 signal 104 may be kept high to turn on TFT 102. During the reduced refresh rate mode of the display 12, the control signals may operate to provide a constant voltage at data line 46 (e.g., the data line 46 may be parked at a predetermined level), for example, between approximately 1V and 2V as well as a constant voltage at reference voltage 108.

To control reset of the voltage 80 at anode 66 to, for example, to the anode reset voltage level 82 at a predetermined rate that differs from the refresh rate of the display 12 (as described above with respect to FIG. 11), the control signals may operate to selectively activate and deactivate circuit switching TFT 50 (whereby circuit switching TFT 50 operates as switch 74) via signals transmitted along the second gate line (scan line) 44 and selectively activate and deactivate TFT 98 (whereby TFT 98 operates as switch 92) via signals transmitted as EM2 signal 106. This selective activation and deactivation of TFT 50 and TFT 98 may occur at a rate greater than the refresh rate of the display 12 to affect reset of the voltage 80 at anode 66 to, for example, to the anode reset voltage level 82 at a predetermined rate that exceeds from the refresh rate of the display 12.

For example, the EM2 signal 106 may be switched from high to low to turn off TFT 98 (e.g., to open switch 92) and the second gate line (scan line) 44 may be switched from low to high to turn on TFT 50 (e.g., to close switch 74) separate from any refresh commands to the display pixel 40. In this manner, the controller 58 may cause the voltage 80 of the anode 66 to be reset to the predetermined anode reset voltage level 82 at a frequency (e.g., measured by time period 99) that exceeds the frequency of the refresh rate of the display 12. Subsequent to the resetting of the voltage 80, the EM2 signal 106 may be switched from low to high to turn on TFT 98 (e.g., to close switch 92) and the second gate line (scan line) 44 may be switched from high to low to turn off TFT 50 (e.g., to open switch 74) until time to reset the voltage 80 again. By controlling the voltage 80 at anode 66, emission (caused by leakage current 72) by the LED 54 between refreshes of the display 12 may be controlled.

Figure 17:
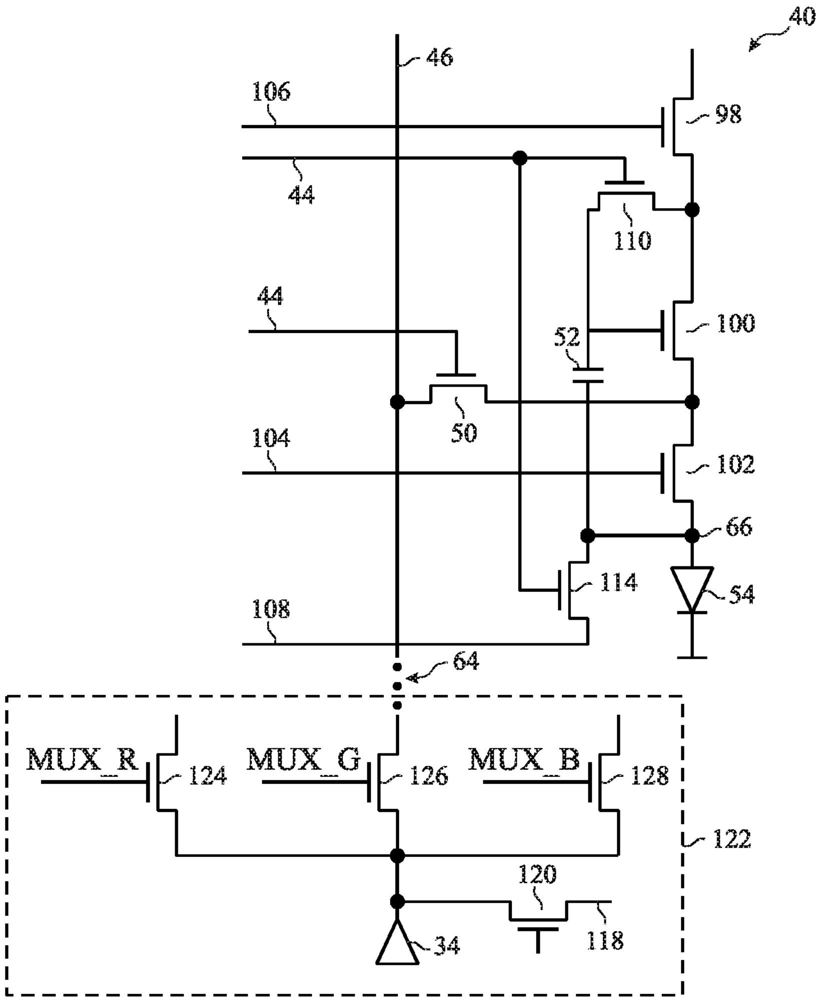
FIG. 17 is a block diagram of the seventh embodiment of a display pixel for use with the LED electronic display of FIG. 6 and associated circuitry, in accordance with an embodiment.

FIG. 17 illustrates circuitry that may be utilized in the control of the display pixel 40 of FIG. 16. As previously discussed, during the reduced refresh rate mode of the display 12 (e.g., a refresh rate of at or below 1 Hz, 5 Hz, 10 Hz, 15 Hz, 20 Hz, or 30 Hz as the predetermined frequency), the control signals may operate to provide a constant voltage at data line 46 (e.g., the data line 46 may be parked at a predetermined level), for example, between approximately 1V and 2V. FIG. 17 illustrates output 64 as the control signals that operate to park the data line 46 at the predetermined voltage.

As illustrated, output 64 may be selectively supplied by the source driver 34 in certain instances (e.g., when the refresh rate of the display 12 is, for example, 20 Hz, 30 Hz, 60 Hz, or another value). In these situations, the source driver is active and the TFT 120 is deactivated by a low value being applied to the gate of the TFT 120 (to cause the TFT 120 to operate as an open switch) to prevent the parking voltage 118 from being transmitted to the output 64. Likewise, when the refresh rate of the display 12 is operating at reduced refresh rate of at or below 1 Hz, 5 Hz, 10 Hz, 15 Hz, or another value, the source driver 34 may be shut down and the TFT 120 may activated by a high value being applied to the gate of the TFT 120 (to cause the TFT 120 to operate as a closed switch) to allow the parking voltage 118 to be transmitted to the output 64.

Additionally illustrated in FIG. 17 is a demultiplexer 122 that may operate to separate a data input signal into its red, green, and blue components for transmission via respective TFTs 124, 126, and 128. When the refresh rate of the display 12 is operating at reduced refresh rate of at or below 1 Hz, 5 Hz, 10 Hz, 15 Hz, or another value, the TFTs 124, 126, and 128 may be activated by a high value being applied to the gate of each of the TFTs 124, 126, and 128 (to cause the TFTs 124, 126, and 128 to operate as a closed switch) to allow the parking voltage 118 to be transmitted to the output 64, supplied to the data line 46, and selectively transmitted as the anode reset voltage level 82 (which the voltage 80 of the anode 66 is reset), as described above with respect to FIG. 16.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display pixel comprising:
- a light-emitting diode;
- a drive transistor coupled in series with the light-emitting diode;
- a reference voltage line;
- an oxide transistor coupled between the reference voltage line and a gate terminal of the drive transistor;
- a switching transistor coupled between a data line and a source terminal of the drive transistor; and
- a capacitor having a first terminal directly coupled to the gate terminal of the drive transistor and having a second terminal directly coupled to the switching transistor.

2. The display pixel of claim 1, wherein the drive transistor comprises a silicon transistor.

3. The display pixel of claim 1, further comprising:
- a first emission transistor coupled to the source terminal of the drive transistor.

4. The display pixel of claim 3, further comprising:
- a second emission transistor coupled between a drain terminal of the drive transistor and the light-emitting diode.

5. The display pixel of claim 4, wherein the first and second emission transistors comprise silicon transistors.

6. The display pixel of claim 1, wherein the switching transistor is directly coupled to the source terminal of the drive transistor.

7. The display pixel of claim 1, further comprising:
- an anode reset transistor coupled to an anode terminal of the light-emitting diode.

8. The display pixel of claim 7, wherein the anode reset transistor is coupled between the anode terminal of the light-emitting diode and the data line.

9. The display pixel of claim 8, wherein the switching transistor and the anode reset transistor comprise silicon transistors.

10. The display pixel of claim 8 wherein the switching transistor is configured to operate at a refresh rate of less than 30 Hz.

11. The display pixel of claim 1, further comprising:
- an anode reset transistor coupled between an anode terminal of the light-emitting diode and the reference voltage line.

12. A display pixel comprising:
- a light-emitting diode;
- a p-type drive transistor coupled in series with the light-emitting diode;
- an oxide transistor coupled between a first voltage line and a terminal of the p-type drive transistor; and
- a first silicon switching transistor coupled between a second voltage line and an anode terminal of the light-emitting diode.

13. The display pixel of claim 12, further comprising:
- a second switching transistor coupled between a gate terminal and an additional terminal of the p-type drive transistor, wherein the first and second switching transistors are configured to receive a same gate line signal.

14. The display pixel of claim 13, further comprising:
- a capacitor coupled between the gate terminal of the p-type drive transistor and the anode terminal of the light-emitting diode;
- a first emission transistor coupled to the additional terminal of the p-type drive transistor; and
- a second emission transistor coupled between the terminal of the p-type drive transistor and the anode terminal of the light-emitting diode.

15. The display pixel of claim 12, wherein the first voltage line comprises a reference voltage and the second voltage line comprises a data line.

16. The display pixel of claim 12, wherein the first silicon switching transistor is activated at a rate greater than or equal to a refresh rate of the display pixel.

17. The display pixel of claim 7, wherein the anode reset transistor is configured to receive a reset voltage separate from the reference voltage.

18. A display pixel comprising:
a light-emitting diode;
a drive transistor coupled in series with the light-emitting diode;
an oxide transistor coupled between a reference voltage line and a terminal of the drive transistor;
a first switching transistor coupled between a data line and an anode terminal of the light-emitting diode; and
a second switching transistor coupled between the data line and a source terminal of the drive transistor.

19. The display pixel of claim 18, wherein the first switching transistor is activated at a rate different than a refresh rate of the display pixel.

20. The display pixel of claim 18, wherein the first switching transistor receives a first control signal and the second switching transistor receives a second control signal different than the first control signal.

* * * * *